United States Patent
Schopfer et al.

(10) Patent No.: US 8,004,863 B2
(45) Date of Patent: Aug. 23, 2011

(54) CIRCUIT DEVICE AND METHOD OF PROVIDING FEEDBACK ACROSS AN ISOLATION BARRIER

(75) Inventors: Walter Stuart Schopfer, Austin, TX (US); Richard Bruce Webb, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 319 days.

(21) Appl. No.: 11/964,361

(22) Filed: Dec. 26, 2007

(65) Prior Publication Data
US 2009/0168462 A1 Jul. 2, 2009

(51) Int. Cl.
*H02M 3/335* (2006.01)
(52) U.S. Cl. ............... 363/21.07; 363/21.05; 363/21.13; 363/21.15
(58) Field of Classification Search ............... 363/21.05, 363/21.07, 21.13, 21.15, 21.01; 329/345, 329/346; 332/144, 146
See application file for complete search history.

(56) References Cited

U.S. PATENT DOCUMENTS

| | | | | |
|---|---|---|---|---|
| 3,771,040 A * | 11/1973 | Fletcher et al. | ............ | 363/21.13 |
| 4,004,110 A | 1/1977 | Whyte | ............ | 179/170 |
| 4,203,012 A * | 5/1980 | Boxall | ............ | 379/405 |
| 4,398,156 A | 8/1983 | Aaland | ............ | 328/233 |
| 4,901,215 A * | 2/1990 | Martin-Lopez | ............ | 363/21.05 |
| 5,063,489 A * | 11/1991 | Inaba | ............ | 363/21.05 |
| 5,349,523 A * | 9/1994 | Inou et al. | ............ | 363/97 |
| 5,498,995 A * | 3/1996 | Szepesi et al. | ............ | 327/538 |
| 6,107,753 A | 8/2000 | Qian | ............ | 315/247 |
| 6,510,062 B2 * | 1/2003 | Goder et al. | ............ | 363/21.11 |
| 6,531,899 B1 | 3/2003 | Male | ............ | 327/100 |
| 6,903,910 B1 | 6/2005 | Griesing et al. | ............ | 361/38 |
| 6,909,739 B1 * | 6/2005 | Eerola et al. | ............ | 375/152 |
| 7,023,717 B2 * | 4/2006 | Nakagawa | ............ | 363/95 |
| 7,042,690 B2 | 5/2006 | Male | ............ | 361/62 |
| 7,057,899 B2 | 6/2006 | AbuGhazaleh et al. | ...... | 361/780 |
| 7,109,793 B2 | 9/2006 | Nakatani et al. | ............ | 330/252 |
| 7,130,201 B2 * | 10/2006 | Yao | ............ | 363/21.04 |
| 7,187,563 B1 | 3/2007 | Bobrek | ............ | 363/21.01 |
| 7,200,014 B1 * | 4/2007 | Hawkes et al. | ............ | 363/21.1 |
| 7,471,531 B2 * | 12/2008 | Blaha et al. | ............ | 363/97 |

(Continued)

OTHER PUBLICATIONS

Texas Instruments, SLUU167, "Low Cost Isolated Power Supply for Power-over-Ethernet (PoE) Applications," Jun. 2003.

*Primary Examiner* — Adolf Berhane
*Assistant Examiner* — Fred E Finch, III
(74) *Attorney, Agent, or Firm* — Polansky & Associates, P.L.L.C.; R. Michael Reed

(57) ABSTRACT

In an embodiment, a circuit device includes a network interface responsive to a powered network to receive a power supply and data and includes an electrical isolation barrier adapted to define a non-isolated power domain and an isolated power domain. The circuit device further includes a first control circuit associated with the non-isolated power domain. The first control circuit is coupled to a primary winding of a transformer to control current flow via the primary winding. The circuit device also includes a second control circuit associated with the isolated power domain. The second control circuit is coupled to a secondary winding of the transformer and is adapted to detect a power error associated with the secondary winding. The second control circuit transfers a command across the electrical isolation barrier to the first control circuit to adjust a current at the primary winding in response to detecting the power error.

25 Claims, 9 Drawing Sheets

U.S. PATENT DOCUMENTS

| | | | |
|---|---|---|---|
| 2002/0093539 A1 | 7/2002 | Os et al. | 345/810 |
| 2002/0135236 A1 | 9/2002 | Haigh et al. | 307/91 |
| 2003/0058664 A1 | 3/2003 | Igarashi | 363/56.12 |
| 2004/0183618 A1 | 9/2004 | Komai | 333/24.2 |
| 2004/0227522 A1 | 11/2004 | Male | 324/524 |
| 2005/0104564 A1 | 5/2005 | Czekay et al. | 323/207 |
| 2005/0168087 A1 | 8/2005 | Yasumura | 310/120 |
| 2005/0195583 A1 | 9/2005 | AbuGhazaleh et al. | 361/780 |
| 2005/0195883 A1* | 9/2005 | Choi et al. | 375/130 |
| 2005/0201071 A1 | 9/2005 | AbuGhazaleh et al. | 391/780 |
| 2005/0207195 A1 | 9/2005 | Olsson et al. | 363/125 |
| 2006/0044858 A1 | 3/2006 | Holme Pedersen et al. | 363/136 |
| 2006/0075173 A1 | 4/2006 | Mattur et al. | 710/301 |
| 2006/0215566 A1 | 9/2006 | Walsh | 370/241 |
| 2006/0256540 A1 | 11/2006 | AbuGhazaleh et al. | 361/788 |
| 2007/0019445 A1 | 1/2007 | Blaha et al. | 363/21.12 |
| 2007/0110081 A1 | 5/2007 | Miller | 370/401 |
| 2007/0121832 A1 | 5/2007 | Ghoshal | 379/93.36 |
| 2007/0287406 A1 | 12/2007 | Kline | 455/402 |
| 2008/0181316 A1* | 7/2008 | Crawley et al. | 375/258 |
| 2008/0267212 A1* | 10/2008 | Crawley et al. | 370/463 |

* cited by examiner

CIRCUIT DEVICE AND METHOD OF PROVIDING FEEDBACK ACROSS AN ISOLATION BARRIER

FIELD OF THE DISCLOSURE

The present disclosure is generally related to a circuit device and method of providing feedback across an isolation barrier.

BACKGROUND

Power over Ethernet (PoE), which is outlined in IEEE Std 802.3™-2005 clause 33 (the PoE standard), refers to a technique for delivering power and data to an electronic device via Ethernet cabling. In a PoE system, a power sourcing equipment (PSE) device provides a power supply to electronic devices, which may be referred to as powered devices, via an Ethernet cable. PoE eliminates the need for a separate power source to deliver power to attached powered devices. Such powered devices may include Voice over Internet Protocol (VoIP) telephones, wireless routers, security devices, field devices to monitor process control parameters, data processors, other electronic devices, or any combination thereof.

In general, the PoE standard requires each of the Ethernet ports associated with a powered device (i.e., an electronic device that receives both power and data from the Ethernet cable) to be electrically isolated from any other conductor that is user accessible, including a metal housing, a display, a touch screen, a switch, a screw, another connector, or any combination thereof. Conventionally, powered devices are isolated using direct-current-to-direct-current (DC-to-DC) converters without a physical connection from the input to the output. For example, particular implementations of forward and flyback switch topologies may utilize a transformer to isolate a PoE interface of the powered device from the rest of its circuitry while also transforming a PoE input voltage to a voltage level that is suitable for powering circuitry of the powered device. Another conventional method of achieving voltage isolation in a PoE environment uses a power converter that includes a transformer and an opto-isolated output voltage feedback to regulate the output voltage. However, such conventional PoE isolation circuitry may use an external reference voltage, which requires additional circuitry. In some instances, such conventional PoE isolation circuitry may also utilize large external capacitors and external opto-isolation devices to provide isolation at a feedback path. Such external devices may increase overall power consumption and circuit costs.

SUMMARY

In a particular embodiment, a circuit device includes a network interface responsive to a powered network to receive a power supply and data and includes an electrical isolation barrier adapted to define a non-isolated power domain and an isolated power domain. The circuit device further includes a first control circuit associated with the non-isolated power domain. The first control circuit is coupled to a primary winding of a transformer and adapted to control current flow via the primary winding. The circuit device also includes a second control circuit associated with the isolated power domain. The second control circuit is coupled to a secondary winding of the transformer and is adapted to detect a power error associated with the secondary winding. The second control circuit transfers a digital command across the electrical isolation barrier to the first control circuit to adjust a current at the primary winding in response to detecting the power error.

In another particular embodiment, a circuit device includes an interface responsive to a powered network to receive an input signal and includes a transformer having a primary winding coupled to the interface and a secondary winding that is inductively coupled to the primary winding. The circuit device further includes a transistor having a first terminal coupled to the primary winding, a control terminal, and a second terminal coupled to a power supply. The circuit device also includes a non-isolated power control circuit coupled to the control terminal to control current flow through the primary winding and includes a feedback path including a first portion and a second portion. The first portion of the feedback path is coupled to the non-isolated control circuit. The feedback path includes at least one pair of capacitors adapted to provide electrical isolation between the first portion and the second portion. The circuit device further includes a feedback circuit that is coupled to the second portion of the feedback path and that is adapted to transmit data related to a voltage level at the secondary winding to the non-isolated power control circuit to adjust the current flow through the primary winding.

In still another particular embodiment, a method of electrically isolating a circuit device is disclosed. The method includes receiving an input signal at a primary winding of a transformer circuit that includes a secondary winding that is inductively coupled to the primary winding. The method further includes comparing a voltage at the secondary winding to a reference voltage to determine a voltage error, generating an adjustment signal related to the voltage error, and generating a reference signal. The method also includes transmitting the reference signal and the adjustment signal to a control circuit via at least two capacitors. The control circuit is coupled to the primary winding and adjusts a current flow at the primary winding based on the adjustment signal.

In yet another particular embodiment, a method is disclosed that includes receiving an input voltage from a Power over Ethernet network cable and providing a first voltage based on the input voltage to a primary winding of a transformer circuit. The method further includes receiving an adjustment signal from a transmitter circuit via a feedback path that crosses an isolation barrier. The adjustment signal includes a reference signal and includes a power adjustment signal related to a voltage error associated with a secondary winding of the transformer circuit. The method further includes decoding the power adjustment signal based on the reference signal to determine a digital command and selectively controlling a transistor circuit that is coupled to the primary winding based on the digital command to alter current flow through the primary winding.

A particular advantage provided by embodiments of the circuit device and the associated methods of isolating the circuit device is that external voltage reference sources and/or external opto-isolation devices can be replaced with integrated reference voltage sources and integrated capacitors, thereby reducing overall circuit costs.

Another particular advantage is that high frequency feedback signals may be used to provide power adjustment commands from an isolated power domain to a non-isolated control circuit without compromising an electrical isolation barrier. In a particular example, the high frequency signals can be used to provide adjustment commands to the non-isolated control circuit to adjust current flow through a primary winding of a transformer circuit.

Still another advantage is that multiple feedback paths may be used to provide an adjustment signal and a reference signal. A receiver circuit may use the adjustment signal and the reference signal to filter spurious high frequency signal artifacts, to reduce noise and other interference, and to decode the adjustment signal.

Other advantages, improvements, and features may become apparent after review of the entire application.

DETAILED DESCRIPTION OF THE DRAWINGS

Figure 1:
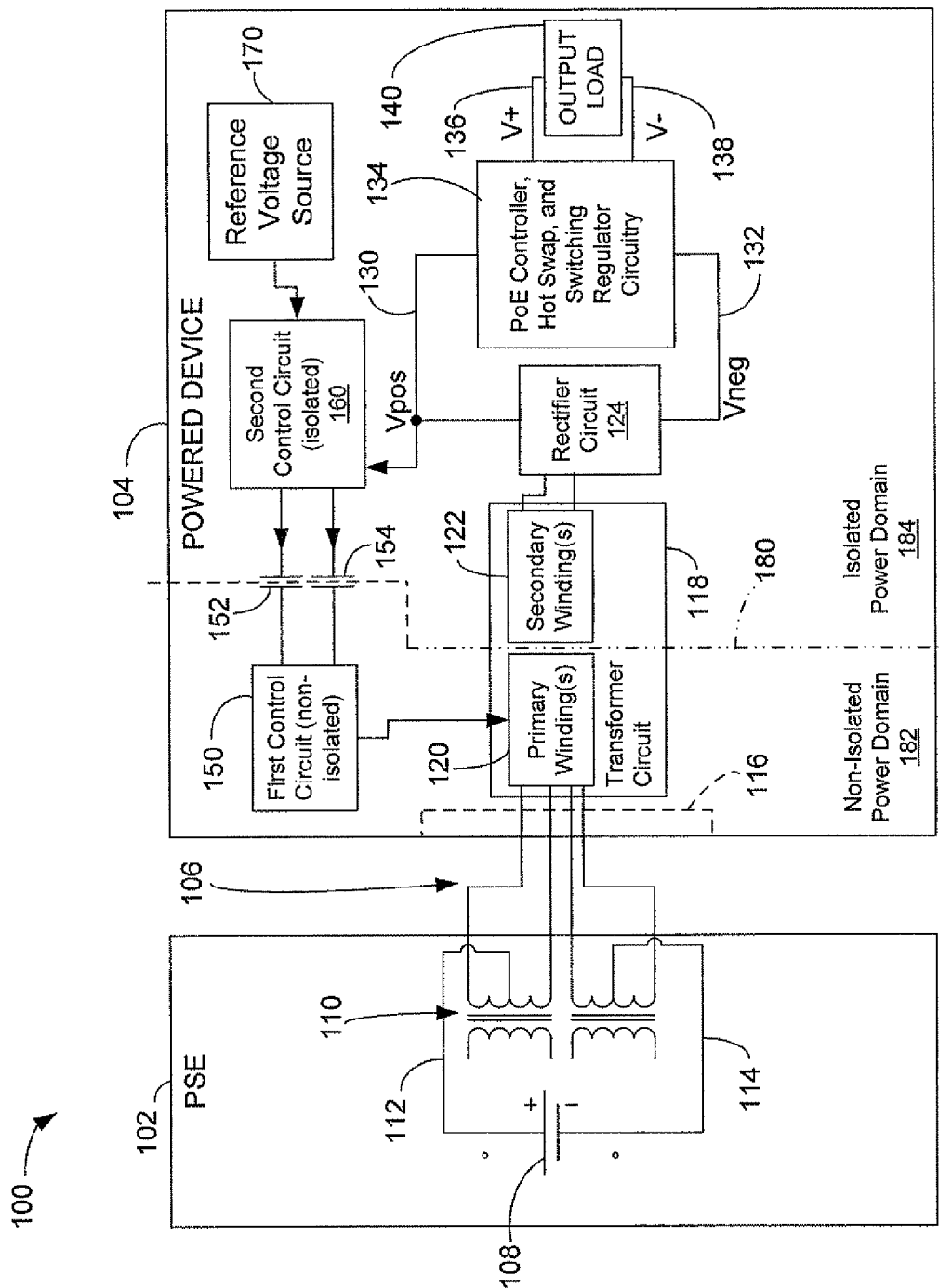
FIG. 1 is a block diagram of a particular illustrative embodiment of a Power over Ethernet (PoE) system including a power sourcing equipment (PSE) device and a powered device having an electrically isolated power domain and a feedback path to provide feedback across an isolation barrier.

FIG. 1 is a block diagram of a particular illustrative embodiment of a Power over Ethernet (PoE) system 100 including a power sourcing equipment (PSE) device 102 and a powered device 104 that communicate via an Ethernet cable 106. The powered device 104 receives power and data via the Ethernet cable 106. In general, the Ethernet cable 106 includes multiple wire pairs, and a power supply may be applied to selected wire pairs of the Ethernet cable 106 by the PSE device 102. The powered device 104 includes an isolation barrier 180 that defines a non-isolated power domain 182 and an isolated power domain 184. The PoE Standard includes isolation requirements that power interface leads, external conductors, and frame ground connections are isolated from internal circuitry associated with the isolated power domain 184. In a particular embodiment, the electrical isolation provided by the isolation barrier 180 is adapted to provide electrical isolation at an effective voltage of 1500 $V_{RMS}$.

The PSE device 102 includes a power supply 108 that is coupled to a transformer 110 via wires 112 and 114. In a particular embodiment, the PSE 102 includes a switch (not shown) to selectively couple the power supply 108 to the transformer 110. The transformer 110 is coupled to wires of the Ethernet cable 106 to provide power to the powered device 104.

The powered device 104 includes an interface 116 that is adapted to couple to the Ethernet cable 106. In a particular embodiment, the interface 116 includes an interface to receive an Ethernet connector (jack), such as an RJ-45 connector. The powered device 104 also includes a transformer circuit 118. The transformer circuit includes a primary winding 120 that is coupled to the interface 116 to receive power from the Ethernet cable 106 and includes a secondary winding 122 that is inductively coupled to the primary winding 120. The secondary winding 122 is coupled to a rectifier circuit 124, which is adapted to receive an induced power supply from the secondary winding 122 and to provide a positive voltage (Vpos) to a first supply terminal 130 and a negative voltage (Vneg) to a second supply terminal 132. The powered device 104 includes Power over Ethernet (PoE) controller, hot swap, and switching regulator circuitry 134, which is adapted to provide a switched power supply to a first power terminal 136 and a second power terminal 138. An output load 140 may be coupled to the first and second power terminals 136 and 138. In a particular embodiment, the output load 140 may include one or more circuit devices.

The powered device 104 also includes a first control circuit 150 that is coupled to the primary winding 120. The powered device 104 is adapted to control current flow through the primary winding 120. The powered device 104 further includes a first capacitor 152 and a second capacitor 154, which are coupled to the first control circuit 150 and to a second control circuit 160 to provide a communication path across the isolation barrier 180. The second control circuit 160 is coupled to an integrated reference voltage source 170 and to the first supply terminal 130.

In a particular illustrative embodiment, the second control circuit 160 is adapted to detect a power supply error by comparing a power supply at the first supply terminal 130 to a reference voltage from the integrated reference voltage source 170. The second control circuit 160 is adapted to generate a power adjustment signal based on the power supply error. The second control circuit 160 transmits the power adjustment signal to the first control circuit 150 via the first and second capacitors 152 and 154. In a particular embodiment, the power adjustment signal is a high frequency digital signal that can be sent across the capacitors 152 and 154 without compromising the isolation barrier 180. In response to receiving the power adjustment signal, the first control circuit 150 is adapted to adjust current flow through the primary winding 120, thereby adjusting an induced current associated with the secondary winding 122. In a particular example, the second control circuit 160 is adapted to provide a feedback signal via the first and second capacitors 152 and 154 to adjust a current flow at the primary winding 120

In a particular embodiment, the capacitors 152 and 154 and the transformer circuit 120 define the isolation barrier 180. The first control circuit 150, the interface 116 and the primary winding 120 of the transformer circuit 118 are associated with the non-isolated power domain 182. The secondary winding 122 of the transformer circuit 118, the second control circuit 160, the reference voltage source 170, the rectifier circuit 124, the PoE controller, hot swap, and switching regulator circuitry 134, and the output load 140 are associated with the isolated power domain 184.

In a particular illustrative embodiment, the power adjustment signal comprises an adjustment command and a reference signal, which may be sent via separate communications paths. In a particular example, the second control circuit 160 is adapted to transmit a reference signal to the first control circuit 150 via the first capacitor 152 and to transmit an adjustment command to the first control circuit 150 via the second capacitor 154. In a particular embodiment, each of the capacitors 152 and 154 have a capacitance that is approximately one (1) picofarad or less. In a particular embodiment, the capacitors 152 and 154 have capacitances of approximately 0.5 picofarads and are adapted to withstand a peak voltage of approximately 3000 volts. In another particular embodiment, the second control circuit 160 is adapted to generate two balanced signals including a first square wave signal and a second square wave signal, where the phase of the second square wave signal is approximately zero (0) degrees or one hundred eighty (180) degrees with respect to the first square wave signal depending on whether the data associated with the adjustment command is high or low. For example, to communicate a logic high signal, the second control circuit 160 is adapted to send a first signal and a second signal where the first and second signals are in phase (i.e., where the phase associated with the second signal varies by zero degrees with respect to a phase associated with the first signal). In another embodiment, to communicate a logic low signal, the first and second signals are one hundred eighty (180) degrees out of phase. In a particular embodiment, the power adjustment signal is a high frequency signal. In a particular embodiment, a high frequency signal is a signal that has a frequency of approximately 20 MHz or greater. In a particular embodiment, a higher frequency signal may consume greater power than a lower frequency signal, and the power adjustment signal may be configured to be approximately 20 MHz to provide communication across the electrical isolation barrier with a reduced power consumption.

In a particular embodiment, the first control circuit 150 is adapted to decode the power adjustment signal using the balanced signals received from the second control circuit 160 via the capacitors 152 and 154. The first control circuit 150 includes a receiver that is adapted to remove longitudinal interference signals associated with the received power adjustment signal. The first control circuit 150 further includes logic adapted to remove spikes and high frequency signal artifacts and to determine an adjustment command based on the decoded adjustment signal. The first control circuit 150 is adapted to adjust current flow through the primary winding 120 in response to the determining the adjustment command.

Figure 2:
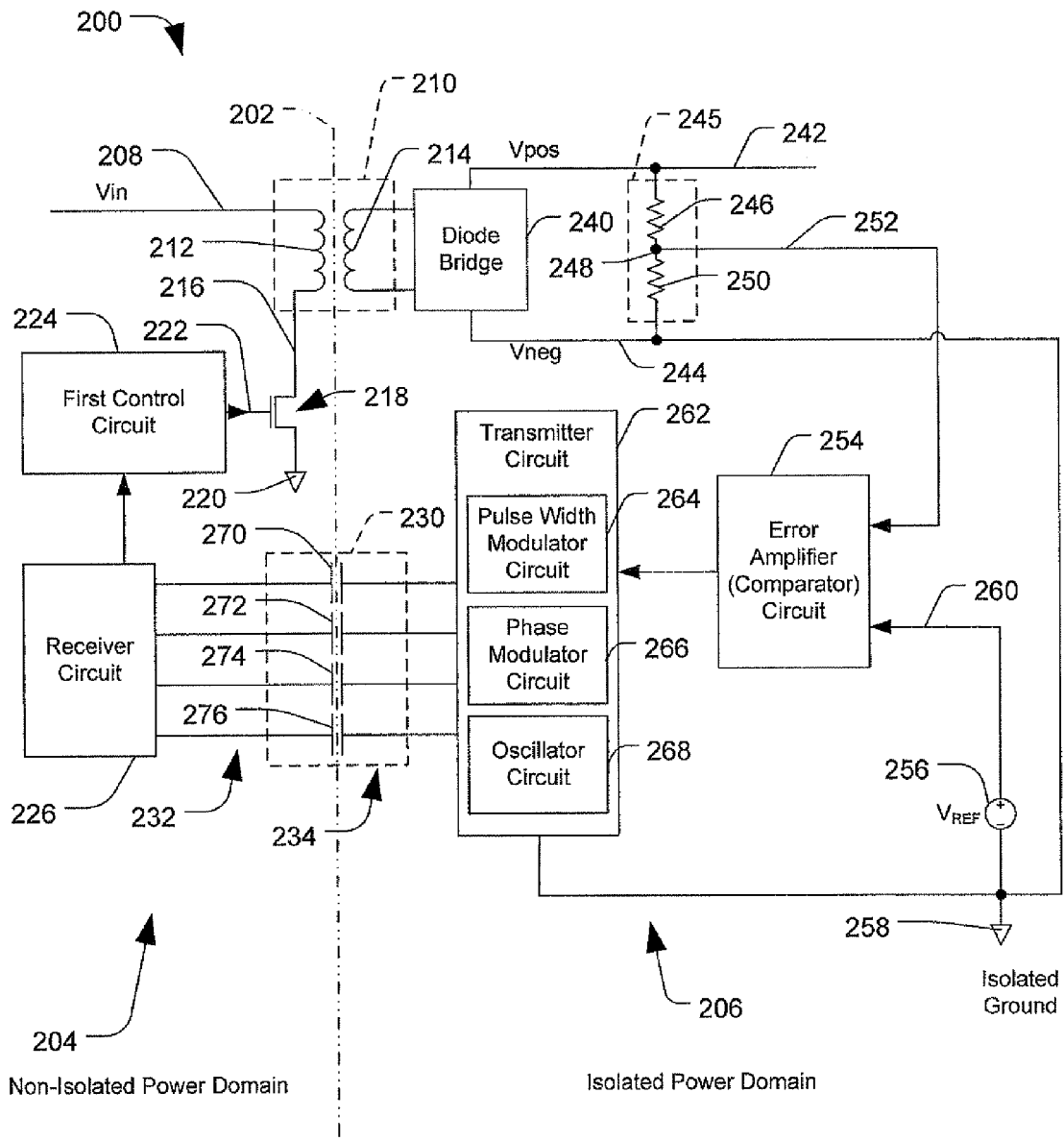
FIG. 2 is a diagram of a particular illustrative embodiment of a circuit device including an electrically isolated power domain and a feedback circuit to provide feedback across an isolation barrier.

FIG. 2 is a diagram of a particular illustrative embodiment of a circuit device 200 including an electrically isolated power domain. The circuit device 200 includes an electrical isolation barrier 202 that defines a non-isolated power domain 204 and an isolated power domain 206. The non-isolated power domain 206 includes an input terminal (Vin) 208 that is coupled to a primary winding 212 of a transformer 210, which includes a secondary winding 214 that is inductively coupled to the primary winding 212. The non-isolated power domain 204 also includes a switch 218 having a first terminal 216 coupled to the primary winding 212, a control terminal 222 coupled to a first control circuit 224, and a second terminal 220 coupled to a power supply source (e.g., an electrical ground). The non-isolated power domain 204 also includes a receiver circuit 226 that is coupled to the first control circuit 224 and that is adapted to receive power adjustment signals via a feedback path 230 that includes a first (non-isolated) portion 232 and a second (isolated) portion 234.

The isolated power domain 206 includes the secondary winding 214 of the transformer circuit 210. The secondary winding 214 is coupled to a diode bridge 240, which is adapted to receive an induced power supply from the secondary winding 214 and to provide a positive power supply (Vpos) to a first terminal 242 and a negative power supply (Vneg) to a second terminal 244. A voltage divider circuit 245 is coupled between the first terminal 242 and the second terminal 244. The voltage divider circuit 245 includes a first resistor 246 coupled to the first terminal 242 and to a node 248. The voltage divider circuit 245 also includes a second resistor 250 coupled to the node 248 and to the second terminal 244. The isolated power domain 206 includes an error amplifier (comparator) circuit 254 that includes a first input 252 that is coupled to the node 248 and a second input 260 that is coupled to a reference voltage source ($V_{REF}$) 256.

In a particular embodiment, the second terminal 244 is coupled to an isolated electrical ground 258. The error amplifier (comparator) circuit 254 is adapted to determine a power error at the secondary winding based on a comparison of the voltage at node 248 to the reference voltage 256. The power error is provided to a transmitter circuit 262, which includes a pulse width modulator (PWM) circuit 264 adapted to generate a PWM signal related to the power error. The transmitter circuit 262 also includes a phase modulator circuit 266 and an oscillator circuit 268.

In a particular embodiment, the oscillator circuit 268 is adapted to generate a high frequency carrier signal, and the phase modulator circuit 266 is adapted to utilize the high frequency carrier signal to produce a first reference signal, a second reference signal, a first adjustment signal, and a second adjustment signal (collectively "the feedback signals"), which are sent to the receiver circuit 226 across the isolation barrier 202 via the feedback path 230. In a particular embodiment, the first reference signal is sent via a first communication path that includes a first capacitor 270. The second reference signal is sent via a second communication path that includes a second capacitor 272. The first adjustment signal is sent via a third communication path that includes a third capacitor 274. The second adjustment signal is sent via a fourth communication path that includes a fourth capacitor 276. The first, second, third, and fourth communication paths and the first, second, third, and fourth capacitors 270, 272, 274, and 276 are part of the feedback path 230. The first, second, third, and fourth capacitors 270, 272, 274, and 276 also provide electrical isolation between the first portion 232 and the second portion 234 of the feedback path 230. In a particular embodiment, the phase modulator circuit 266 is adapted to modulate a phase of the first and second reference signals and of the first and second adjustment signals. The transmitter circuit 262 transmits the feedback signals across the isolation barrier 202 via the feedback path 230, without compromising the electrical isolation of the isolated power domain 206. In particular, the feedback signals are high frequency signals that can be passed by the first, second, third, and fourth capacitors 270, 272, 274, and 276, which are adapted to prevent a direct current from passing between the non-isolated power domain 204 and the isolated power domain 206.

In a particular embodiment, a signal is received at the input terminal 208. The transformer circuit 210 provides electrical isolation between the non-isolated power domain 204 and the isolated power domain 206. The transformer circuit 210 provides an induced power supply via the secondary winding 214 to the diode bridge 240, which provides a rectified power supply to the first and second terminals 242 and 244. The error amplifier circuit 254 compares a voltage at the node 248 (that is coupled to the secondary winding 214 via the resistors 246 and 248 and via the diode bridge 240) to a reference voltage from a reference voltage source 256 to determine a power error. The error amplifier circuit 254 provides the power error to the transmitter circuit 262, which generates a digital power adjustment command and transmits the digital power adjustment command to the receiver circuit 226 via the feedback path 230. In a particular embodiment, the digital power adjustment command includes multiple signals, such as a first adjustment signal, an inverted version of the adjustment signal, a first reference signal, and an inverted version of the reference signal. The receiver circuit 226 decodes the power adjustment command and provides a control signal to the first control circuit 224, which is adapted to selectively apply a voltage to the control terminal 222 of the switch 218 to adjust a current flow from the input terminal 208 through the primary winding 212 and through the switch 218 to the power supply source coupled to the second terminal 220.

In a particular embodiment, the transmitter circuit 262 is adapted to generate and transmit balanced signal pairs to the receiver circuit 226 via the feedback path 230. In this example, the term balanced signal pair refers to a pair of signals that have a common frequency and amplitude, but which may vary in phase. The receiver circuit 226 is adapted to receive the balanced signal pairs, such as the first and second reference signals, and to use the balanced signal pairs to filter longitudinal interference and other noise from the received signals. Further, the receiver circuit 226 is adapted to decode the adjustment signal and to provide the adjustment signal to the first control circuit 224. In a particular embodiment, the receiver circuit 226 is adapted to subtract longitudinal signals and to sum the desired adjustment signal. The first control circuit 224 is adapted to apply a voltage to the control terminal 222 to adjust current flow through the switch 218. In a particular embodiment, the switch 218 is a metal oxide semiconductor field effect transistor (MOSFET) device.

Figure 3:
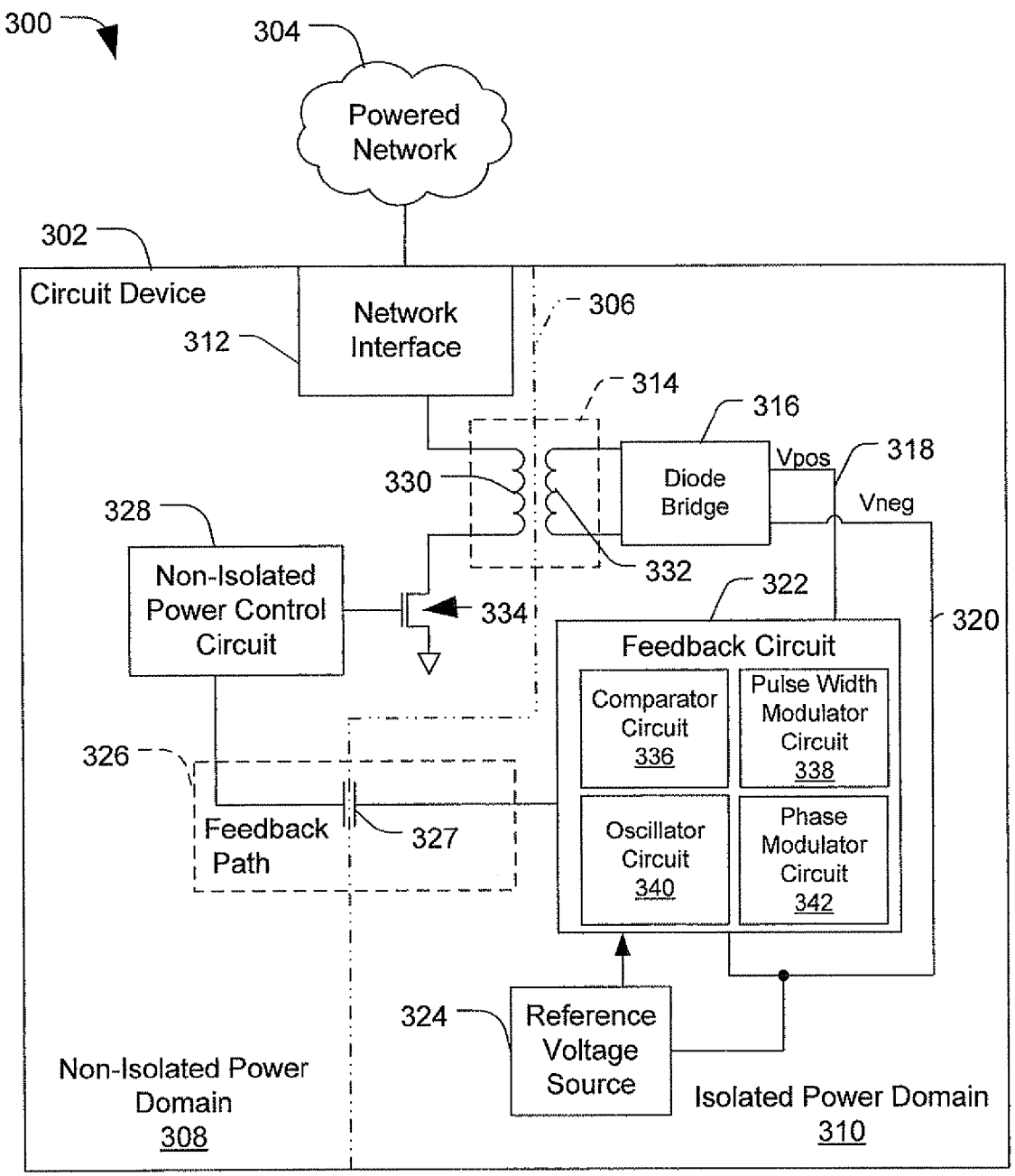
FIG. 3 is a diagram of a second particular illustrative embodiment of a circuit device including an electrically isolated power domain and a feedback circuit to provide feedback across an isolation barrier.

FIG. 3 is a diagram of a second particular illustrative embodiment of a system 300 including a circuit device 302 having an electrically isolated power domain. The circuit device 302 is responsive to a powered network 304 to receive power and data. In a particular embodiment, the powered network 304 is a Power over Ethernet network. In another particular embodiment, the powered network 304 includes another type of network that is adapted to provide power and data via a cable.

The circuit device 302 includes an isolation barrier 306 that defines a non-isolated power domain 308 and an isolated power domain 310. The circuit device 302 includes a network interface 312 that is coupled to the powered network 304 to receive power and data and that is coupled to a transformer circuit 314. The transformer circuit 314 includes a primary winding 330 that is coupled to the network interface 312 and a secondary winding 332 that is inductively coupled to the primary winding 330. The secondary winding 332 is coupled to a diode bridge 316, which provides a positive power supply (Vpos) to a first terminal 318 and a negative power supply (Vneg) to a second terminal 320. The circuit device 302 also includes a feedback circuit 322 that is coupled to the first and second terminals 318 and 320. The feedback circuit 322 is coupled to a reference voltage source 324 and to a feedback path 326 that has a capacitor circuit 327. In a particular embodiment, the capacitor circuit 327 may include multiple capacitors. The feedback path 326 is coupled to a non-isolated power control circuit 328, which is coupled to a control terminal of a switch 334. The switch 334 includes a first terminal that is coupled between the primary winding 330 of the transformer circuit 314 and a second terminal that is coupled to a power supply source (e.g., an electrical ground).

The feedback circuit 322 includes a comparator circuit 336 adapted to compare a voltage associated with the secondary winding 332 to a reference voltage from the reference voltage source 324 to determine a power error. The feedback circuit 322 also includes a pulse width modulator circuit 338 that is adapted to generate a pulse width modulated (PWM) signal that is related to the determined power error. The feedback circuit 322 also includes an integrated oscillator circuit 340 that is adapted to generate an oscillating signal. The feedback circuit 322 further includes a phase modulator circuit 342 that is adapted to utilize the oscillating signal and the PWM signal to generate a power adjustment signal.

In a particular illustrative embodiment, the network interface 312 receives a power supply from the powered network 304. The network interface 312 provides the power supply to the primary winding 330 of the transformer circuit 314. A secondary power supply is induced at the secondary winding 332 and is provided to the diode bridge 316, which rectifies the secondary power supply and provides the rectified power supply to the first and second terminals 318 and 320. The comparator circuit 336 compares a voltage associated with the secondary power supply to the reference voltage 324 to determine a power error. The pulse width modulator circuit 338 generates a pulse width modulated signal based on the power error. The oscillator circuit 340 generates an oscillating signal, which is used by the phase modulator circuit 342 to modulate the pulse width modulated signal into a high frequency signal that is transmitted to the non-isolated power control circuit 328 via the feedback path 326. The non-isolated power control circuit 328 is adapted to adjust current flow through the primary winding 330 by applying a control signal to the control terminal of the switch 334. In a particular embodiment, by reducing a voltage applied to the control terminal, the non-isolated power control circuit 328 controls the switch 334 to throttle a current path, reducing current flow through the switch 334 and through the primary winding 330 and reducing an induced current at the secondary winding 332. In another particular embodiment, by increasing a voltage applied to the control terminal, the non-isolated power control circuit 328 controls the switch 334 to increase current flow through the primary winding 330 and the secondary winding 332. In yet another particular embodiment, the switch 334 is activated by reducing a voltage at the control terminal and is turned off by increasing the voltage at the control terminal.

In a particular illustrative embodiment, the switch 334 is an n-channel metal oxide semiconductor field effect transistor (MOSFET) device. In another particular embodiment, the switch 334 is a p-channel MOSFET device, and the non-isolated power control circuit 328 applies a zero voltage or negative voltage signal to the control terminal of the switch 334 to activate the switch 334 and applies a positive voltage signal to the control terminal to turn off the switch 334.

Figure 4:
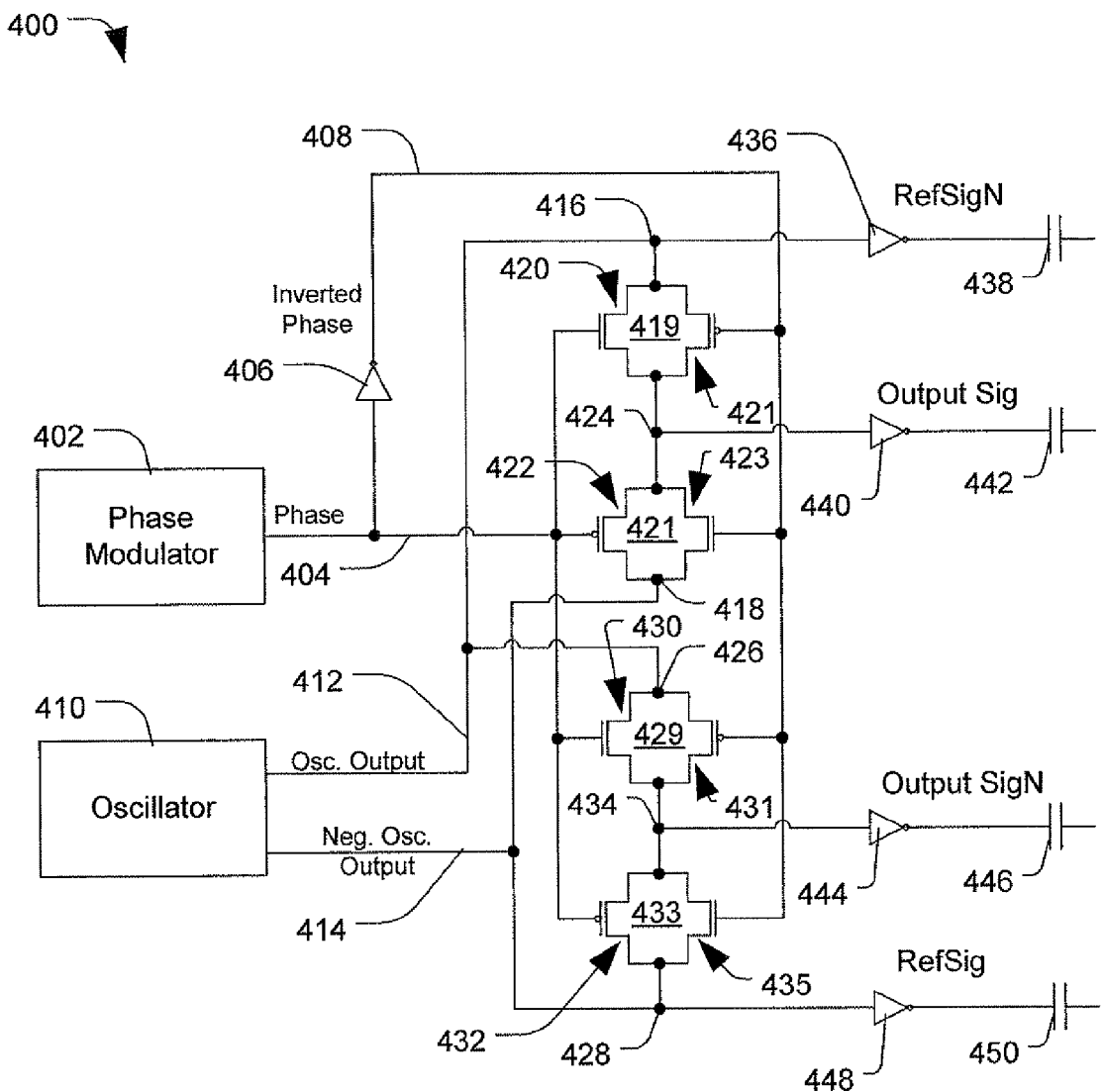
FIG. 4 is a diagram of a particular illustrative embodiment of a transmitter circuit for transmitting a feedback signal across an electrical isolation barrier.

FIG. 4 is a diagram of a particular illustrative embodiment of a transmitter circuit 400 for transmitting a feedback signal across an electrical isolation barrier (i.e., capacitors 438, 442, 446, and 450). The transmitter circuit 400 includes a phase modulator 402 adapted to generate a signal having a particular phase at a first terminal 404. The signal is inverted by an inverter 406 that is coupled to the first terminal 404 to provide an inverted version of the signal having the particular phase at a second terminal 408. The transmitter circuit 402 also includes an oscillator circuit 410 that generates an oscillating signal at a third terminal 412 and an inverted version of the oscillating signal at a fourth terminal 414. The transmitter circuit 400 further includes a first transmitter pair 419 having a first n-channel transistor 420 and a first p-channel transistor 421 coupled in parallel between a first node 416 and a second node 424. The first node 416 is coupled to the third terminal 412. The first n-channel transistor 420 includes a control terminal that is coupled to the first terminal 404, and the first p-channel transistor 421 includes a control terminal that is coupled to the second terminal 408. The transmitter circuit 400 also includes a second transmitter pair 421 having a second p-channel transistor 422 and a second n-channel transistor 423 coupled in parallel between the second node 424 and a third node 418. The third node 418 is coupled to the fourth terminal 414. The second n-channel transistor 423 includes a control terminal coupled to the second terminal 408, and the second p-channel transistor 422 includes a control terminal coupled to the first terminal 404. The transmitter circuit 400 further includes a third transmitter pair 429 having a third n-channel transistor 430 and a third p-channel transistor 431 coupled in parallel between a fourth node 426 and a fifth node 434. The fourth node 426 is coupled to the third terminal 412. The third n-channel transistor 430 includes a control terminal coupled to the first terminal 404, and the third p-channel transistor 431 includes a control terminal coupled to the second terminal 408. The transmitter circuit 400 also includes a fourth transmitter pair 433 having a fourth p-channel transistor 432 and a fourth n-channel transistor 435 coupled in parallel between the fifth node 434 and a sixth node 418. The sixth node 418 is coupled to the fourth terminal 414. The fourth n-channel transistor 435 includes a control terminal coupled to the second terminal 408, and the fourth p-channel transistor 432 includes a control terminal coupled to the first terminal 404.

The transmitter circuit 400 further includes a first inverter 436 having an input coupled to the first node 416 and an output coupled to a first capacitor 438. The transmitter circuit 400 also includes a second inverter 440 having an input coupled to the second node 424 and an output coupled to the second capacitor 442. The transmitter circuit 400 further includes a third inverter 444 having an input coupled to the fifth node 434 and an output coupled to the third capacitor 446. The transmitter circuit 400 also includes a fourth inverter 448 having an input coupled to the sixth node 428 and an output coupled to the fourth capacitor 450.

In a particular illustrative embodiment, the phase modulator 402 applies a signal including a phase to the first terminal 404 and the inverter 406 provides an inverted version of the signal to the second terminal 408. The oscillator 410 applies an oscillating signal to the third terminal 412 and an inverted version of the oscillating signal to the fourth terminal 414. The oscillating signal is applied to the first node 416 and to the fourth node 426, and the inverted version of the oscillating signal is applied to the third node 418 and to the sixth node 428. The oscillating signal is inverted by the inverter 436 and provides an inverted reference signal at the capacitor 438, and the inverted version of the oscillating signal is inverted by the inverter 448 and provided as a reference signal at the capacitor 450. The phase and the inverted phase signals are provided at the control terminals of the transistor pairs 419, 421, 429 and 433 and the output at node 424 is inverted by the second inverter 440 and provided as the output signal (i.e., a power adjustment signal) at the second capacitor 442. The output at node 434 is inverted by the third inverter 444 and provided as an inverted version of the output signal (i.e., Output SigN) at the third capacitor 446. In a particular embodiment, the reference signal at the fourth capacitor 450, the inverted version of the reference signal at the first capacitor 438, the output signal at the first capacitor 442, and the inverted version of the output signal at the third capacitor 446 are transmitted across an electrical isolation barrier to a receiver circuit at a non-isolated power domain of the circuit device. The first, second, third, and fourth capacitors 438, 442, 444, and 450 are part of the isolation barrier to prevent a direct current from flowing between the isolated power domain and the non-isolated power domain. The output signal may include control signal information, such as a power adjustment command, which may be used by a power control circuit to adjust current flow through a primary winding of a transformer (such as the primary winding 330 of the transformer 314 illustrated in FIG. 3).

Figure 5:
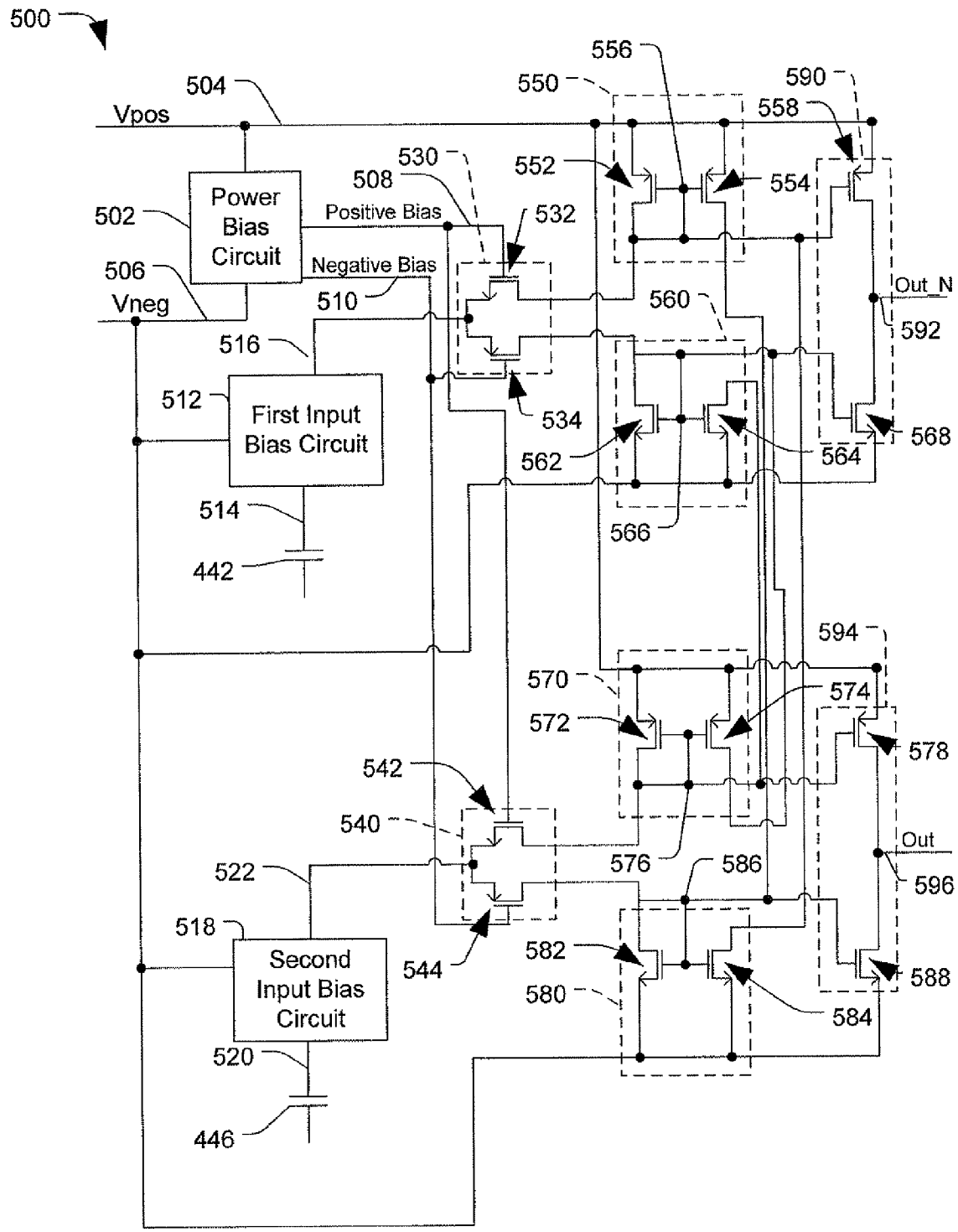
FIG. 5 is a diagram of a particular illustrative embodiment of a receiver circuit for receiving the feedback signal across an electrical isolation barrier.

FIG. 5 is a diagram of a particular illustrative embodiment of a receiver circuit 500 adapted to receive a feedback signal across an electrical isolation barrier, such as the second and third capacitors 442 and 446 illustrated in FIG. 4. In a particular embodiment, the receiver circuit 500 represents a portion of the receiver circuit 226 illustrated in FIG. 2. The receiver circuit 500 includes a power bias circuit 502 that is coupled to a first power supply terminal (Vpos) 504 and to a second power supply terminal (Vneg) 506. The power bias circuit 502 is adapted to provide a positive bias signal via a first bias terminal 508 and a negative bias signal via a second bias terminal 510.

The receiver circuit 500 further includes a first input bias circuit 512 that is responsive to a first input 514, which is coupled to the second capacitor 442. The first input bias circuit 512 provides a first biased input to a first input terminal 516. The receiver circuit 500 also includes a second input bias circuit 518 that is responsive to a second input 520, which is coupled to the third capacitor 446. The second input bias circuit 518 is adapted to provide a second biased input to a second input terminal 522.

The receiver circuit 500 further includes a first steering circuit 530 and a second steering circuit 540. The first steering circuit 530 includes a first steering transistor 532 having a first source terminal coupled to the first input terminal 516, a first gate terminal coupled to the first bias terminal 508, and a first drain terminal coupled to a node 556. The first steering circuit 530 further includes a second steering transistor 534 having a second source terminal coupled to the first input terminal 516, a second gate terminal coupled to the second bias terminal 510, and a second drain terminal coupled to a node 566. In a particular embodiment, the first steering transistor 532 is an n-channel metal oxide semiconductor field effect transistor (MOSFET) device and the second steering transistor 534 is a p-channel MOSFET device.

The second steering circuit 540 includes a third steering transistor 542 having a third source terminal coupled to the second input terminal 522, a third gate terminal coupled to the first bias terminal 508, and a third drain terminal coupled to a node 576. The second steering circuit 540 further includes a fourth steering transistor 544 having a fourth source terminal coupled to the second input terminal 522, a fourth gate terminal coupled to the second bias terminal 510, and a fourth drain terminal coupled to a node 586.

The receiver circuit 500 also includes first, second, third, and fourth current mirrors 550, 560, 570, and 580. The first current mirror (CM) 550 includes a first CM transistor 552 having a first CM source terminal coupled to the first power supply terminal 504, a first CM gate terminal coupled to the node 556, and a first CM drain terminal coupled to the node 556. The first CM 550 also includes a second CM transistor 554 having a second CM source terminal coupled to the first power supply terminal 504, a second CM gate terminal coupled to the node 556, and a second CM drain terminal coupled to the node 586.

The second CM 560 includes a third CM transistor 562 having a third CM drain terminal coupled to the node 566, a third CM gate terminal coupled to the node 566, and a third CM source terminal coupled to the second power supply terminal 506. The third CM 560 also includes a fourth CM transistor 564 having a fourth CM drain terminal coupled to the node 576, a fourth CM gate terminal coupled to the node 566, and a fourth CM source terminal coupled to second power supply terminal 506.

The third CM 570 includes a fifth CM transistor 572 having a fifth CM source terminal coupled to the first power supply terminal 504, a fifth CM gate terminal coupled to the node 576, and a fifth CM drain terminal coupled to the node 576. The third CM 570 further includes a sixth CM transistor 574 having a sixth CM source terminal coupled to the first power supply terminal 504, a sixth CM gate terminal coupled to the node 576, and a sixth CM drain terminal coupled to the node 566.

The fourth CM 580 includes a seventh CM transistor 582 having a seventh CM drain terminal coupled to the node 586, a seventh CM gate terminal coupled to the node 586, and a seventh CM drain terminal coupled to the second power supply terminal 506. The fourth CM 580 further includes an eighth CM transistor 584 having an eighth CM drain terminal coupled to the node 556, an eighth CM gate terminal coupled to the node 586, and an eighth CM source terminal coupled to the second power supply terminal 506.

The receiver circuit 500 also includes a first amplifier circuit 590 including a first amplifying transistor 558 having a first amplifier source terminal coupled to the first power supply terminal 504, a first amplifier gate terminal coupled to the node 556, and a first amplifier drain terminal coupled to a first amplifier output 592. The first amplifier circuit 590 also includes a second amplifying transistor 568 including a second amplifier drain terminal coupled to the first amplifier output 592, a second amplifier gate terminal coupled to the node 566, and a second amplifier source terminal coupled to the second power supply terminal 506. The receiver 500 further includes a second amplifier circuit 594 including a third amplifying transistor 578 having a third amplifier source terminal coupled to the first power supply terminal 504, a third amplifier gate terminal coupled to the node 576, and a third amplifier drain terminal coupled to a second amplifier output 596. The second amplifier circuit 594 also includes a fourth amplifying transistor 588 including a fourth amplifier drain terminal coupled to the second amplifier output 596, a fourth amplifier gate terminal coupled to the node 586, and a fourth amplifier source terminal coupled to the second power supply terminal 506.

In a particular embodiment, input signals are received from the transmitter circuit 400 illustrated in FIG. 4 via the second and third capacitors 442 and 446, which electrically isolate the receiver circuit 500 from the transmitter circuit 400. In a particular illustrative embodiment, the input signals correspond to the output signal (Output Sig) and the negative version of the output signal (Output SigN) indicated at the second and third capacitors 442 and 446 illustrated in FIG. 4. In another particular embodiment, the input signals may correspond to the reference signal (RefSig) and the inverted version of the reference signal (RefSigN) at the fourth and first capacitors 450 and 438, respectively, illustrated in FIG. 4.

In general, the input signals are received via the capacitors 442 and 446, which are low value capacitors, such as capacitors having a capacitance of approximately one (1) picofarad or less. In a particular embodiment, the capacitance of the capacitors 442 and 446 may vary according to process tolerances, such that the value is approximately 1 pF or less. The input signals are approximately 180 degrees out of phase, such that a first input signal at the first input 514 is approximately 180 degrees out of phase from a second input signal at the second input 518. The first and second steering circuits 530 and 540 direct positive and negative currents at their inputs to the first, second, third, and fourth current mirrors 550, 560, 570, and 580. A first current output of the first current mirror 550 is combined with a fourth current output of the fourth current mirror 580, and a second current output of the second current mirror 560 is combined with a third current output of the third current mirror 570. By combining the first, second, third, and fourth current outputs in this manner, a balanced component of the input signals is accepted and a longitudinal component of the input signals is rejected. The combined currents are fed to the first and second amplifier circuits 590 and 594 to provide a balanced output signal at the first and second outputs 592 and 596, where longitudinal components of the inputs signal are not present in the output signal.

In a particular embodiment, the first, second, third, and fourth current mirrors 550, 560, 570, and 580 cooperate to eliminate longitudinal noise and other interference from the received input signal, leaving a balanced output signal, which may be used by logic at the receiving circuitry to control a current flow via a primary winding of a transformer. In a particular illustrative embodiment, the a receiver circuit includes a plurality of current mirror circuits, such as the first, second, third, and fourth current mirrors 550, 560, 570, and 580. The first, second, third, and fourth current mirrors 550, 560, 570, and 580 are cross-coupled to cancel longitudinal components associated with first and second feedback signals received via the first and second inputs 514 and 520. The first, second, third, and fourth current mirrors 550, 560, 570, and 580 cooperate to provide a balanced output signal at a first amplifier output 592 and at the second amplifier output 596. In a particular embodiment, a logic circuit is coupled to the first amplifier output 592 and to the second amplifier output 596 and is adapted to control current flow via the primary winding. In a particular embodiment, the logic circuit is the first control circuit 150 illustrated in FIG. 1, the first control circuit 224 illustrated in FIG. 2, or the non-isolated power control circuit 328 illustrated in FIG. 3. In the particular embodiment of the first control circuit 150 illustrated in FIG. 1, the receiver circuit 500 is included in the first control circuit 150. In the embodiment of the non-isolated power control circuit 328 illustrated in FIG. 3, the receiver circuit 500 is also included in the non-isolated power control circuit 328.

Figure 6:
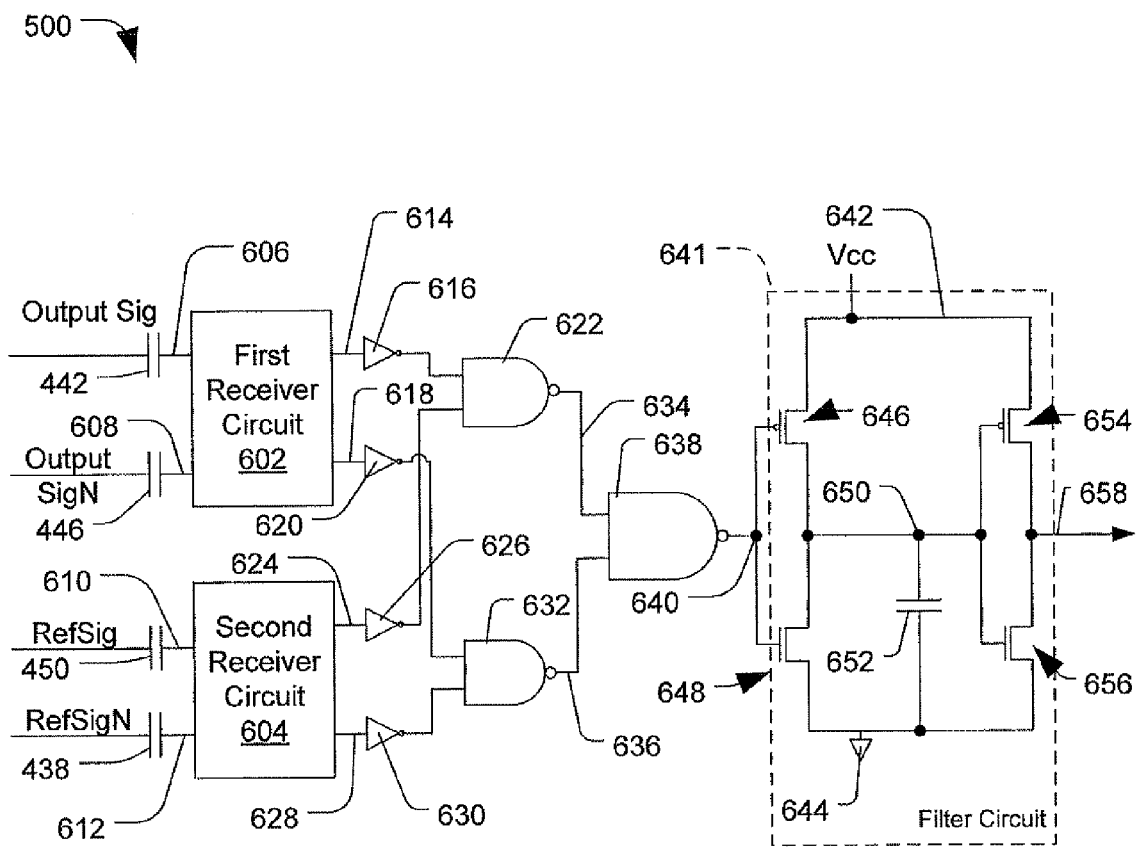
FIG. 6 is a diagram of a particular illustrative embodiment of a receiver circuit for receiving a feedback signal across an electrical isolation barrier from a transmitter circuit, such as the transmitter circuit of FIG. 4.

FIG. 6 is a diagram of a particular illustrative embodiment of a receiver circuit 600 for receiving a feedback signal from a transmitter circuit across an electrical isolation barrier. In a particular embodiment, the receiver circuit 600 may be coupled to the transmitter circuit 400 illustrated in FIG. 4 via the first, second, third and fourth capacitors 438, 442, 446, and 450, respectively. The receiver circuit 600 includes a first receiver circuit 602 and a second receiver circuit 604. The first and second receiver circuits 602 and 604 may include the receiver circuit 500 illustrated in FIG. 5. The first receiver circuit 602 includes a first input 606 to receive an output signal, such as a power adjustment signal, from a transmitter circuit via the second capacitor 442. The first receiver circuit 602 also includes a second input 608 to receive an inverted version of the output signal from the transmitter circuit via the third capacitor 446. The second receiver circuit 604 includes a third input 610 to receive a reference signal from the transmitter circuit via the fourth capacitor 450 and includes a fourth input 612 to receive an inverted version of the reference signal from the transmitter circuit via the first capacitor 438.

The first receiver 602 is coupled to a first inverter 616, which is coupled to a first input of a first NAND logic gate 622. The first receiver circuit 602 provides a first output 614 to the first inverter 616 and an inverted version of the first output 614 is provided as a first input to the first NAND gate 622. The receiver circuit 602 is also coupled to a second inverter 620, which is coupled to a third input of a second NAND logic gate 632. The first receiver circuit 602 provides a second output 618 to the second inverter 620 and an inverted version of the second output 618 is provided as a third input to the second NAND logic gate 632. The second receiver circuit 604 is coupled to a third inverter 626, which is coupled to a second input of the first NAND logic gate 622. The second receiver circuit 602 provides a first reference output 624 to the third inverter 626 and an inverted version of the first reference output 624 is provided to the second input of the first NAND logic gate 622. The second receiver 604 is coupled to a fourth inverter 630, which is coupled to a fourth input of the second NAND logic gate 632. The second receiver circuit 604 provides a second reference output 628 to the fourth inverter 630 and an inverted version of the second reference output 628 is provided to the fourth input of the second NAND logic gate 632.

The first NAND logic gate 622 includes a first NAND output 634 that is coupled to a first input of a third NAND logic gate 638. The second NAND logic gate 632 includes a second NAND output 636 that is coupled to a second input of the third NAND logic gate 638. The third NAND logic gate 638 has a third NAND output that is coupled to a first node 640. The filter circuit 641 includes a filter circuit 641 that has a first power supply terminal 642 and a second power supply terminal 644. The filter circuit 641 includes a first p-channel transistor 646 including a first terminal coupled to the first power supply terminal, a control terminal coupled to the first node, and a second terminal coupled to a second node 650. The filter circuit 641 also includes a first n-channel transistor 648 that includes a first terminal coupled to the node 650, a control terminal coupled to the node 640, and a second terminal coupled to the second power supply terminal 644. The filter circuit 641 further includes a capacitor 652 coupled between the node 650 and the second power supply terminal 644.

The filter circuit 641 also includes a second p-channel transistor 654 including a third terminal coupled to the first power supply terminal 642, a second control terminal coupled to the second node 650, and a fourth terminal coupled to a filter output node 658. The filter circuit 641 further includes a second n-channel transistor 656 that has a third terminal coupled to the node 658, a second control terminal coupled to the node 650, and a fourth terminal coupled to the second power supply terminal 644.

In a particular illustrative embodiment, the first and second receiver circuits 602 and 604 have current mode inputs and the respective outputs are reproduced versions of the input signal without longitudinal interference. The first, second, and third NAND logic gates 622, 632, and 638 operate as an exclusive NOR logic circuit, and the output at the node 640 is filtered via the filter circuit 641 to remove any spikes or high frequency signal artifacts.

In a particular embodiment, the receiver circuit 600 amplifies and clips the input signal. In a particular embodiment, the input signal has a frequency of 20 MHz. The receiver circuit 600 is adapted to generate an output at the filter output node 658 that does not respond to longitudinal noise unless the amplitude of the first, second, third, and fourth inputs 606, 608, 610, and 612 overcomes a longitudinal rejection provided by current mirror circuits within the first and second receiver circuits 602 and 604. In a particular embodiment, the currents from the longitudinal signals are subtracted and the desired input signal currents are summed to produce the output signal at the filter output node 658.

Figure 7:
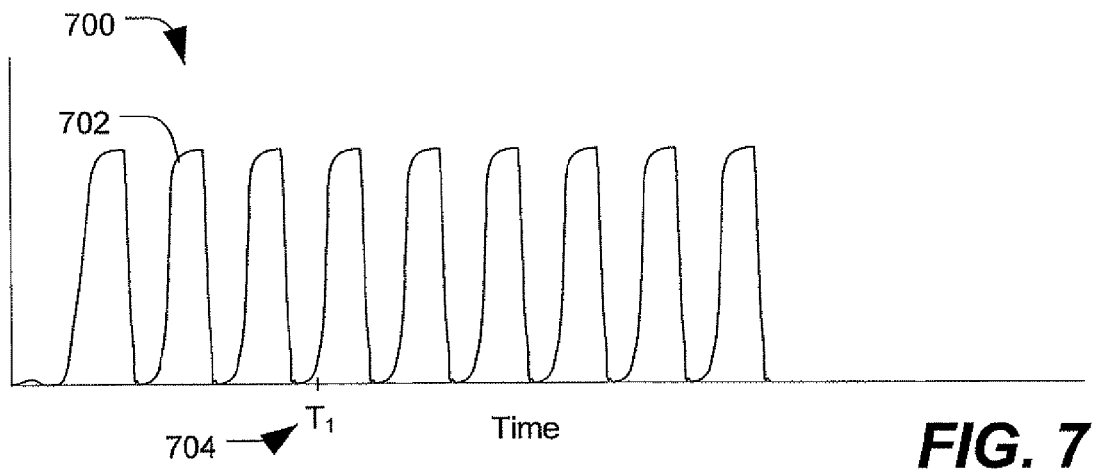
FIG. 7 is a diagram illustrating a transient response of a reference signal during a period of operation that includes a transition related to an adjustment signal.

FIG. 7 is a diagram 700 illustrating a transient response of a reference signal 702 during a period of operation that includes a transition ($T_1$) related to an adjustment signal. The reference signal 702 is a representative example of a square wave signal having a frequency of approximately 20 MHz and illustrating at transition ($T_1$) at 704. In a particular embodiment, the transition ($T_1$) is related to a change (i.e., a rising or falling edge) of a pulse width modulated signal at the transmitter. In a particular embodiment, the transition ($T_1$) 704 does not alter the transient response of reference signal 702.

Figure 8:
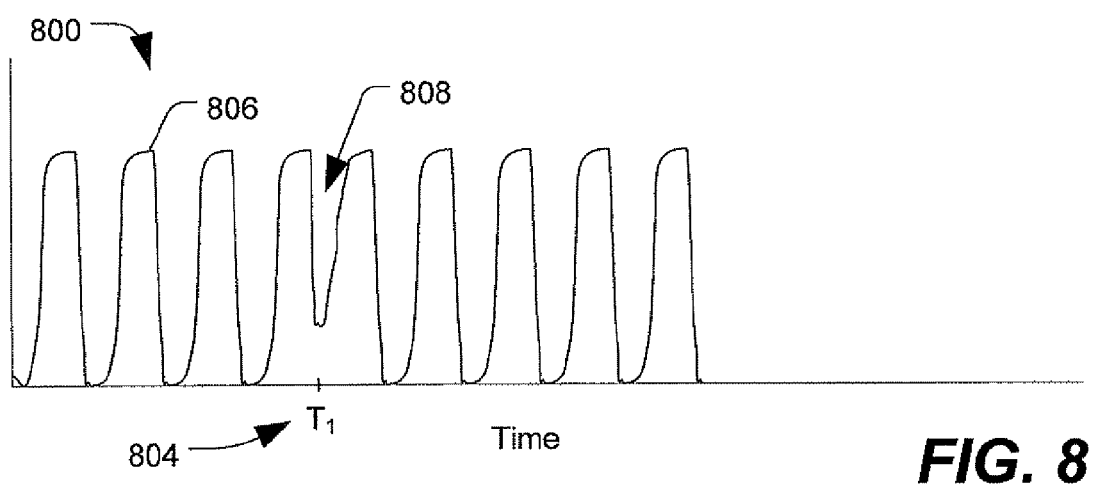
FIG. 8 is a diagram illustrating a transient response of an output signal during a period of operation that includes a transition related to an adjustment signal.

FIG. 8 is a diagram 800 illustrating a transient response of an output signal 806 of the transmitter during a period of operation that includes a transition ($T_1$) related to a pulse width modulated (PWM) signal. In a particular embodiment, the transition ($T_1$) is related to a change (i.e., a rising or falling edge) of a pulse width modulated signal at the transmitter. The output signal 806 represents a phase-modulated signal that includes data related to a power adjustment command. The output signal 806 has a frequency of approximately 20 MHz. The transient response of the output signal 806 at the transition ($T_1$) 804 includes a phase shift. Such a phase shift is generally indicated at 808. For example, when the PWM signal changes, a phase of the output signal 806 is changed as shown at 808.

Figure 9:
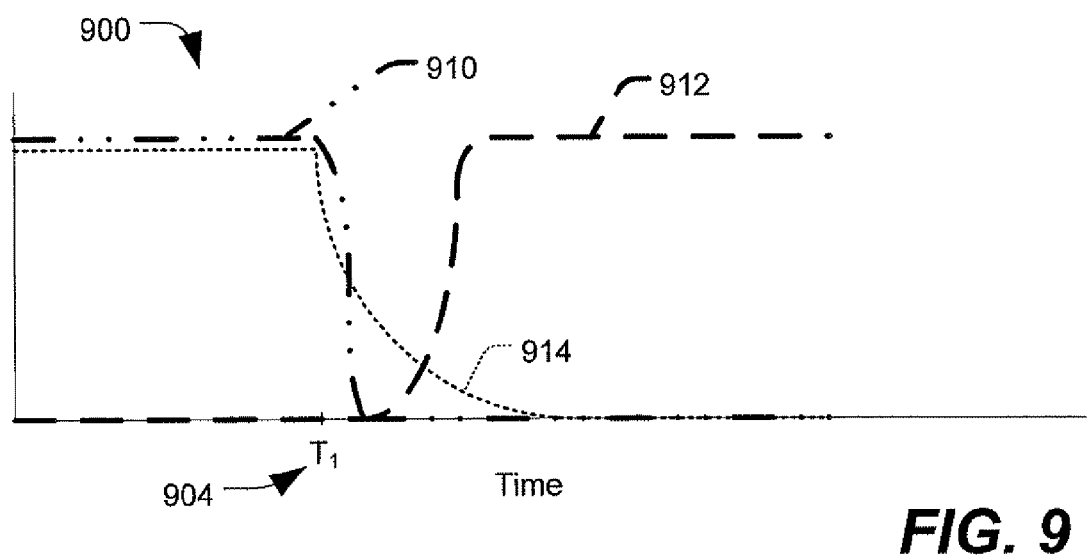
FIG. 9 is a diagram illustrating transient responses of signals at an output of a logic circuit, at an output of a filter circuit, and at an output of a pulse width modulator circuit during a period of operation that includes a transition related to an adjustment signal.

FIG. 9 is a diagram 900 illustrating transient responses of signals at an output of a logic circuit (such as the first node 640 illustrated in FIG. 6), at an output of a filter circuit (such as the filter output node 658 of the filter circuit 641 illustrated in FIG. 6), and at an output of a pulse width modulator circuit (such as the pulse width modulator circuit 264 illustrated in FIG. 2) during a period of operation that includes a transition ($T_1$) related to an adjustment signal. A signal at the output of the pulse width modulator circuit is generally indicated at 912. The PWM output signal 912 is at a logic low level until the transition ($T_1$) 904 and then rises to a logic high level. A signal at the output of the logic circuit is generally indicated at 910. The logic circuit output signal 910 is at a logic high level until the transition ($T_1$) 904. At the transition ($T_1$) 904, the logic circuit output signal 910 falls to a logic low level. A signal at the filter output is generally indicated at 914. The filter output signal 914 generally tracks the logic circuit output 910. However, at the transition ($T_1$) 904, the filter output signal 914 decays exponentially, representing the presence of the capacitor 652 illustrated in the filter 641 in FIG. 6.

Figure 10:
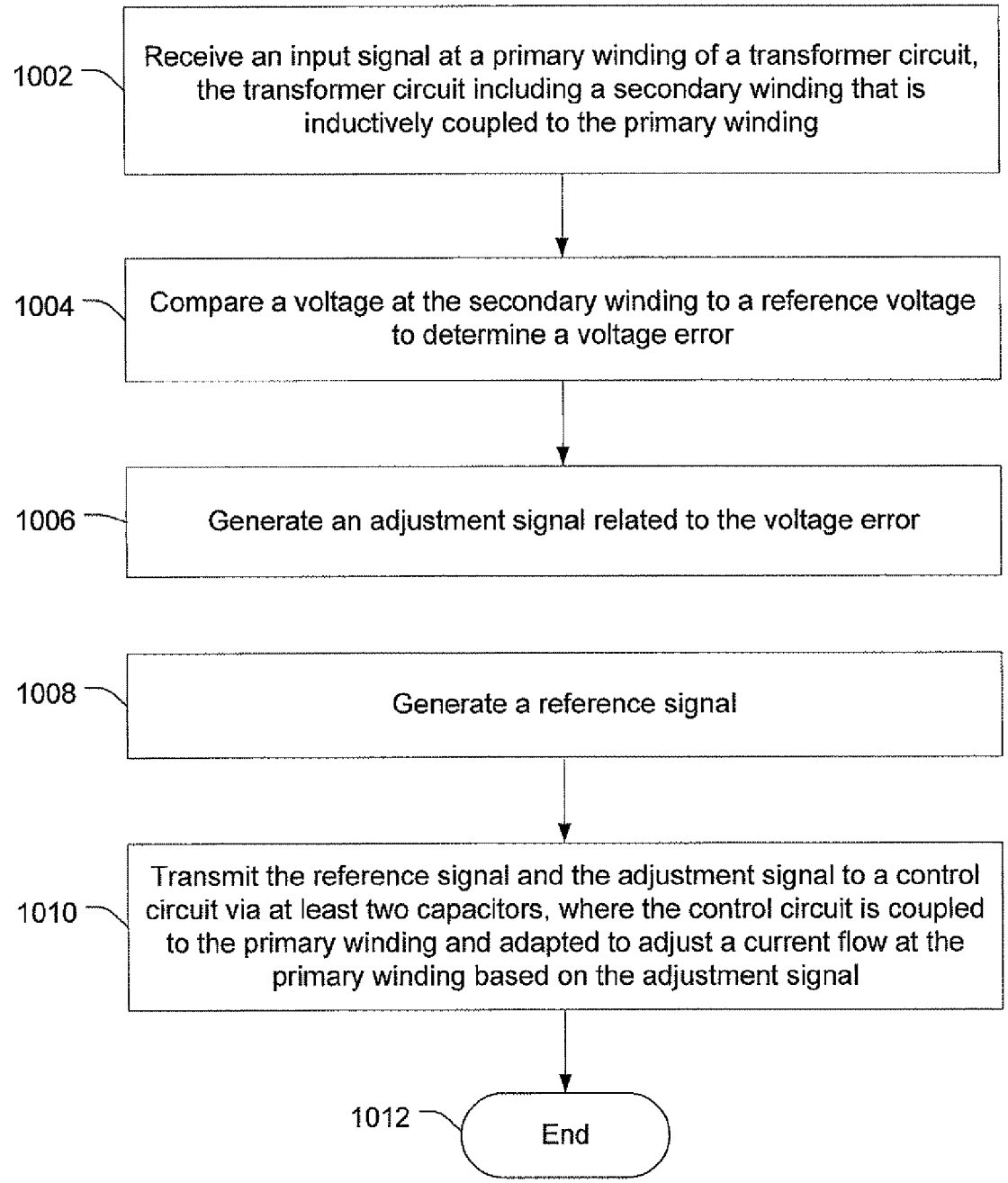
FIG. 10 is a flow diagram of a particular illustrative embodiment of a method of providing feedback across an isolation barrier.

FIG. 10 is a flow diagram of a particular illustrative embodiment of a method of providing feedback across an electrical isolation barrier. At 1002, an input signal is received at a primary winding of a transformer circuit, which includes a secondary winding that is inductively coupled to the primary winding. Continuing to 1004, a voltage at the secondary winding is compared to a reference voltage to determine a voltage error. Moving to 1006, an adjustment signal that is related to the voltage error is generated. In a particular embodiment, a pulse width modulated signal is generated based on the voltage error, and the pulse width modulated signal is modulated at a phase modulation circuit based on an oscillating signal. Continuing to 1008, a reference signal is also generated. In a particular embodiment, the reference signal includes the oscillating signal. In yet another particular embodiment, generating the reference signal and the adjustment signal includes generating a first square wave signal and a second square wave signal. In a particular example, the first square wave signal has a first phase and the second square wave signal has a second phase that is either in-phase or 180 degrees out of phase with respect to the first phase of the first square wave signal. Advancing to 1010, the reference signal and the adjustment signal are transmitted to a control circuit via at least two capacitors, where the control circuit is coupled to the primary winding and adapted to adjust a current flow at the primary winding based on the adjustment signal. In a particular embodiment, the reference signal and the adjustment signal are transmitted as a digital command that is transferred across an isolation boundary, where the isolation boundary is provided by the transformer circuit and the at least two capacitors. The method terminates at 1012.

Figure 11:
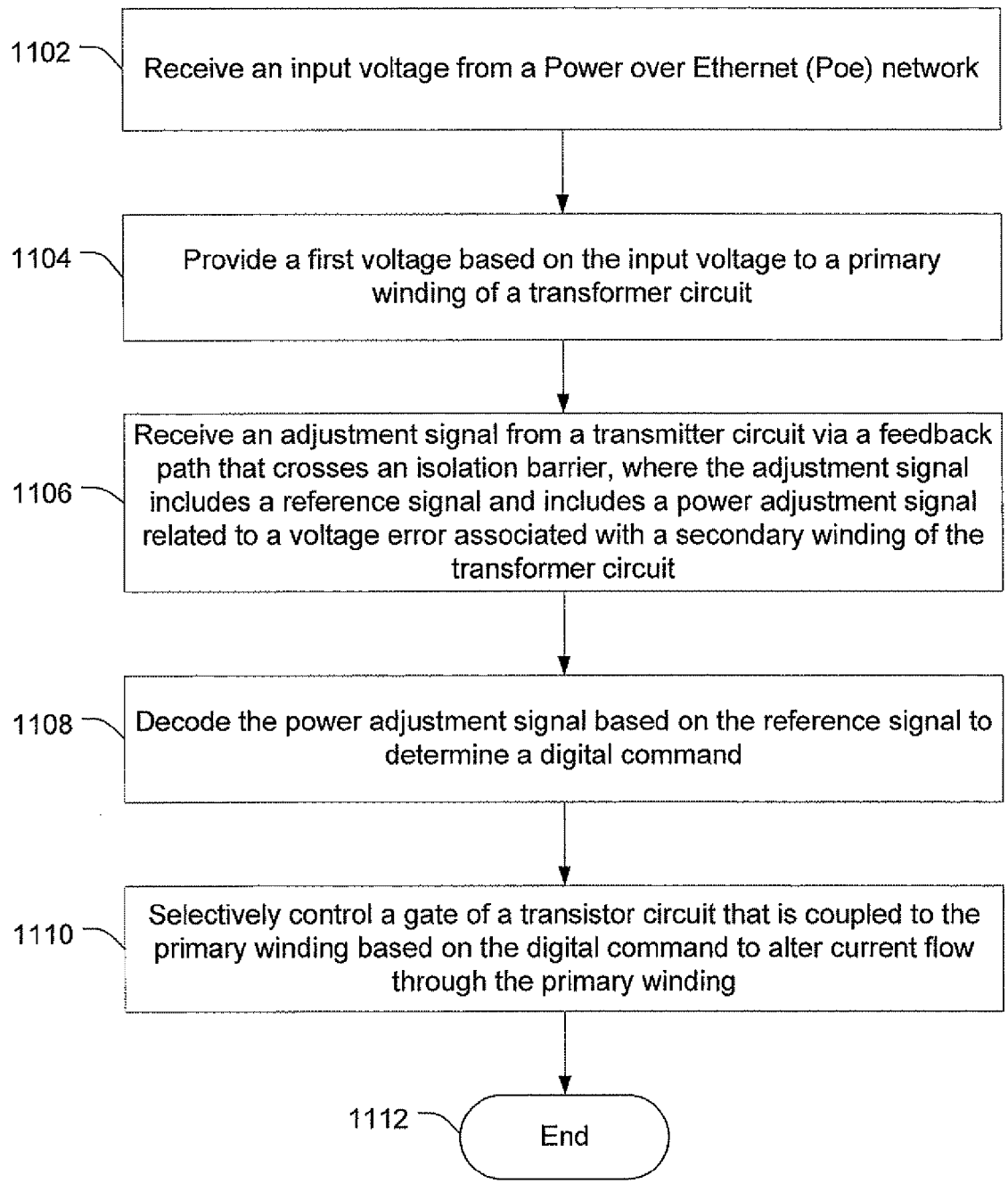
FIG. 11 is a flow diagram of a second particular illustrative embodiment of a method of providing feedback across an isolation barrier.

FIG. 11 is a flow diagram of a second particular illustrative embodiment of a method of providing feedback across an electrical isolation barrier. At 1102, an input voltage is received from a Power over Ethernet (PoE) network. Advancing to 1104, a first voltage based on the input voltage is provided to a primary winding of a transformer circuit. Continuing to 1106, an adjustment signal is received from a transmitter circuit via a feedback path that crosses an isolation barrier, where the adjustment signal includes a reference signal and includes a power adjustment signal related to a voltage error associated with a secondary winding of the transformer circuit. In a particular embodiment, the adjustment signal is a high frequency signal and the feedback path includes two or more capacitors to maintain electrical isolation while permitting the high frequency signal to cross the isolation barrier. In a particular embodiment, the reference signal and the power adjustment signal have a common frequency, and the power adjustment signal has a phase component that is either in-phase with or 180 degrees out-of-phase with the reference signal. Moving to 1108, the power adjustment signal is decoded based on the reference signal to determine a digital command. In a particular illustrative embodiment, the power adjustment signal is decoded by providing the reference signal and the power adjustment signal to an exclusive NOR logic circuit to produce a correlated signal and filtering the correlated signal to remove spikes and high frequency artifacts from the correlated signal. The correlated signal includes the digital command. Proceeding to 1110, a gate of a transistor circuit that is coupled to the primary winding is selectively controlled based on the digital command to alter current flow through the primary winding. The method terminates at 1112.

In a particular illustrative embodiment, the isolation barrier includes the transformer circuit and at least two capacitors. In another particular embodiment, the power adjustment signal is received via a first capacitor of the at least two capacitors and the reference signal is received via a second capacitor of the at least two capacitors. In yet another particular embodiment, receiving the adjustment signal includes receiving the reference signal having a carrier frequency and a first phase and receiving the power adjustment signal having the carrier frequency and a second phase. In another embodiment, decoding the power adjustment signal includes determining that the digital command is a logic high signal when the first phase and the second phase are in phase and determining that the digital command is a logic low signal when the first phase and the second phase are out of phase.

In general, while the above-discussion has largely addressed a Power over Ethernet (PoE) implementation, it should be understood that the circuit device and method of providing feedback across an isolation barrier may be used with other types of systems that require electrical isolation. In a particular embodiment, multiple integrated capacitors may be used to provide multiple communication paths for providing high frequency feedback across an isolation barrier without compromising electrical isolation of an isolated power domain associated with a portion of the circuit device.

Although the present specification describes components and functions that may be implemented in particular embodiments with reference to particular standards and protocols, the disclosed embodiments are not limited to such standards and protocols. For example, standards for Power over Ethernet and other power and data transmission techniques (such as broadband Internet over power lines) represent examples of the state of the art. Such standards are periodically superseded by updated equivalents having essentially the same functions. For example, the PoE standard may be superseded by a PoE plus standard that, among other modifications, allows for transmission of higher voltages to powered devices that support such voltages. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A circuit device comprising:
 a network interface responsive to a powered network to receive a power supply and data;
 an electrical isolation barrier adapted to define a non-isolated power domain and an isolated power domain;
 a first control circuit associated with the non-isolated power domain, the first control circuit coupled to a primary winding of a transformer and adapted to control current flow via the primary winding; and
 a second control circuit associated with the isolated power domain, the second control circuit coupled to a secondary winding of the transformer, the second control circuit adapted to detect a power error associated with the secondary winding and to transfer a digital command across the electrical isolation barrier to the first control circuit to adjust a current at the primary winding in response to detecting the power error; the digital command comprising:
a first reference signal;
a second reference signal that is an inverted version of the first reference signal;
a first power adjustment signal encoded using the reference signal; and
a second power adjustment signal that is an inverted version of the first power adjustment signal.

2. The circuit device of claim 1, wherein the electrical isolation barrier comprises:
the transformer circuit including the primary winding associated with the non-isolated power domain and the secondary winding associated with the isolated power domain; and
at least one capacitor including a first terminal associated with the non-isolated power domain and a second terminal associated with the isolated power domain.

3. The circuit device of claim 2, wherein the second control circuit transfers the digital command to the first control circuit via the at least one capacitor.

4. The circuit device of claim 1, wherein the second control circuit comprises:
a pulse width modulator coupled to the secondary winding to generate a pulse width signal related to a power supply error at the secondary winding; and
a signal generation circuit coupled to the pulse width modulator to generate a carrier signal to provide the digital command to the first control circuit.

5. The circuit device of claim 4, wherein the signal generation circuit comprises:
an oscillator to generate an oscillator signal; and
a phase modulator coupled to the pulse width modulator to receive the pulse width signal and coupled to the oscillator to receive the oscillator signal, the phase modulator to generate the carrier signal based on the oscillator signal.

6. The circuit device of claim 4, wherein the second control circuit further comprises an error amplifier including a first input coupled to the secondary winding and including a second input coupled to a reference voltage, the error amplifier including an output coupled to the pulse width modulator.

7. A method of isolating a circuit device, the method comprising:
receiving an input signal at a primary winding of a transformer circuit, the transformer circuit including a secondary winding that is inductively coupled to the primary winding;
comparing a voltage at the secondary winding to a reference voltage to determine a voltage error;
generating an adjustment signal related to the voltage error and an inverted version of the adjustment signal;
generating a reference signal encoded using the reference signal and an inverted version of the reference signal; and
transmitting the reference signal, the inverted version of the reference signal, the adjustment signal, and the inverted version of the adjustment signal to a control circuit via at least four capacitors, the control circuit coupled to the primary winding and adapted to adjust a current flow at the primary winding based on the adjustment signal.

8. The method of claim 7, wherein generating the adjustment signal comprises:
generating a pulse width modulated signal based on the voltage error; and
modulating the pulse width modulated signal at a phase modulation circuit based on an oscillating signal.

9. The method of claim 8, wherein the reference signal comprises the oscillating signal.

10. The method of claim 7, wherein transmitting the reference signal, the inverted version of the reference signal, the inverted version of the adjustment signal, and the adjustment signal comprises transferring a digital command across an isolation boundary, wherein the isolation boundary is provided by the transformer circuit and the at least four capacitors.

11. The method of claim 7, wherein generating the reference signal and the adjustment signal comprises generating a first square wave signal and a second square wave signal.

12. The method of claim 11, wherein the first square wave signal has a first phase and wherein the second square wave signal has a second phase that is either in-phase or 180 degrees out of phase with respect to the first phase.

13. The method of claim 7, wherein each of the at least two capacitors has a capacitance of less than approximately 1 picofarad.

14. A method comprising:
receiving an input voltage from a Power over Ethernet network cable;
providing a first voltage based on the input voltage to a primary winding of a transformer circuit;
receiving an adjustment signal from a transmitter circuit via a feedback path that crosses an isolation barrier, the adjustment signal including a reference signal, an inverted version of the reference signal, a power adjustment signal encoded using the reference signal and related to a voltage error associated with a secondary winding of the transformer circuit, and an inverted version of the power adjustment signal;
subtracting the inverted version of the power adjustment signal from the power adjustment signal to determine the adjustment signal and subtracting the inverted version of the reference signal from the reference signal to determine a filtered reference signal;
decoding the adjustment signal based on the filtered reference signal to determine a digital command; and
selectively controlling a transistor circuit that is coupled to the primary winding based on the digital command to alter current flow through the primary winding.

15. The method of 14, wherein decoding the power adjustment signal comprises:
providing the reference signal and the power adjustment signal to an exclusive NOR logic circuit to produce a correlated signal; and
filtering the correlated signal to remove spikes and high frequency artifacts from the correlated signal;
wherein the correlated signal comprises the digital command.

16. The method of claim 14, wherein the reference signal and the power adjustment signal have a common frequency and wherein the power adjustment signal has a phase component that is either in-phase with or 180 degrees out-of-phase with the reference signal.

17. The method of claim 14, wherein the isolation barrier comprises the transformer circuit and at least two capacitors, wherein the power adjustment signal is received via a first capacitor of the at least two capacitors and wherein the reference signal is received via a second capacitor of the at least two capacitors.

18. The method of claim 14, wherein receiving the adjustment signal comprises receiving the reference signal having a carrier frequency and a first phase and receiving the power adjustment signal having the carrier frequency and a second phase.

19. The method of claim 18, wherein decoding the power adjustment signal comprises:
   determining that the digital command comprises a logic high signal when the first phase and the second phase are in phase; and
   determining that the digital command comprises a logic low signal when the first phase and the second phase are out of phase.

20. A circuit device comprising:
   an interface responsive to a powered network to receive an input signal;
   a transformer including a primary winding coupled to the interface and including a secondary winding that is inductively coupled to the primary winding;
   a transistor including a first terminal coupled to the primary winding, a control terminal, and a second terminal coupled to a power supply;
   a non-isolated power control circuit coupled to the control terminal to control current flow through the primary winding;
   a feedback path including a first portion and a second portion, the first portion coupled to the non-isolated control circuit, the feedback path including at least one pair of capacitors adapted to provide electrical isolation between the first portion and the second portion; and
   a feedback circuit coupled to the second portion of the feedback path and adapted to transmit a digital command related to a voltage level at the secondary winding to the non-isolated power control circuit to adjust the current flow through the primary winding, the digital command including a reference signal, an inverted version of the reference signal, an encoded adjustment signal that is encoded using the reference signal, and an inverted version of the adjustment signal.

21. The circuit device of claim 20, wherein the feedback circuit comprises:
   a comparator including a first input coupled to the secondary winding and a second input coupled to a reference voltage source, the comparator including an output to provide an error signal;
   a pulse width modulator (PWM) circuit coupled to the output of the comparator to generate a PWM signal related to the error signal; and
   a phase modulator circuit adapted to convert the PWM signal to a digital signal having a carrier frequency, the phase modulator circuit adapted to send the digital signal and a reference signal to the non-isolated power control circuit via the feedback path as part of the digital command.

22. The circuit device of claim 21, wherein the carrier frequency is approximately 20 MHz or greater.

23. The circuit device of claim 21, wherein the feedback circuit further comprises an oscillator circuit to provide a carrier signal to the phase modulator circuit for mixing with the PWM signal to produce the digital signal.

24. The circuit device of claim 20, wherein the feedback path includes a first feedback path and a second feedback path adapted to carry a first feedback signal and a second feedback signal that is approximately 180 degrees out of phase with the first feedback signal.

25. The circuit device of claim 24, wherein the non-isolated power control circuit comprises:
   a receiver circuit including a plurality of current mirror circuits that are cross-coupled to cancel longitudinal components associated with the first and second feedback signals and to provide a balanced output signal at a first output and a second output; and
   a logic circuit coupled to the first output and the second output and to the control terminal of the transistor, the logic circuit to control current flow via the primary winding by selectively applying a signal to the control terminal.

* * * * *